United States Patent Office 2,796,561
Patented June 18, 1957

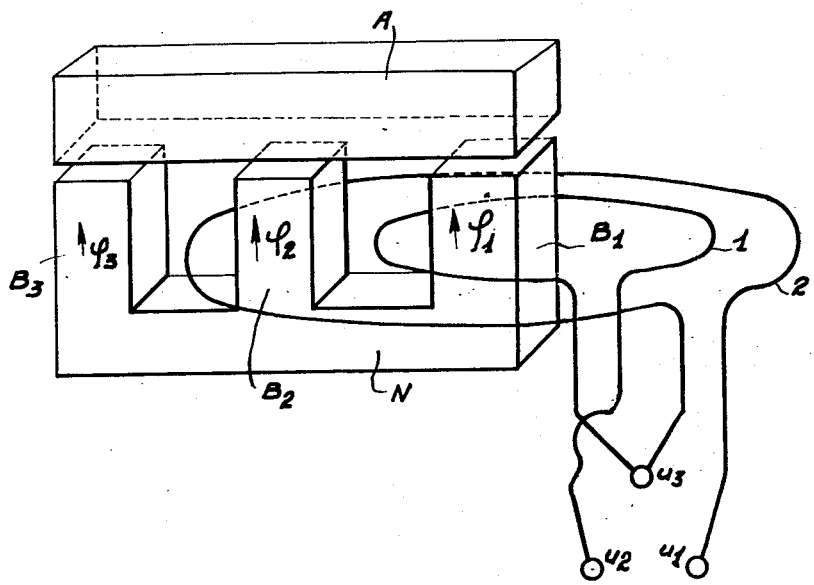
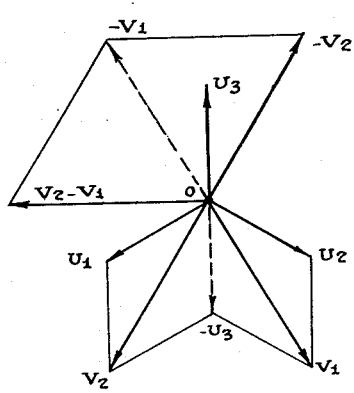

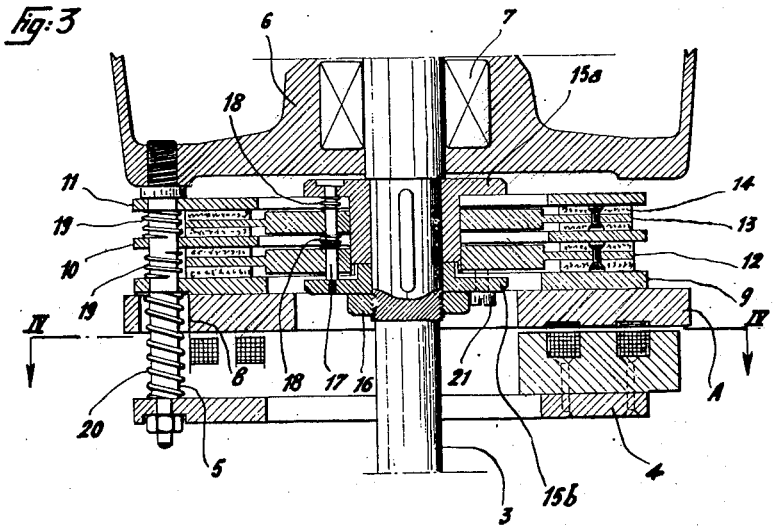
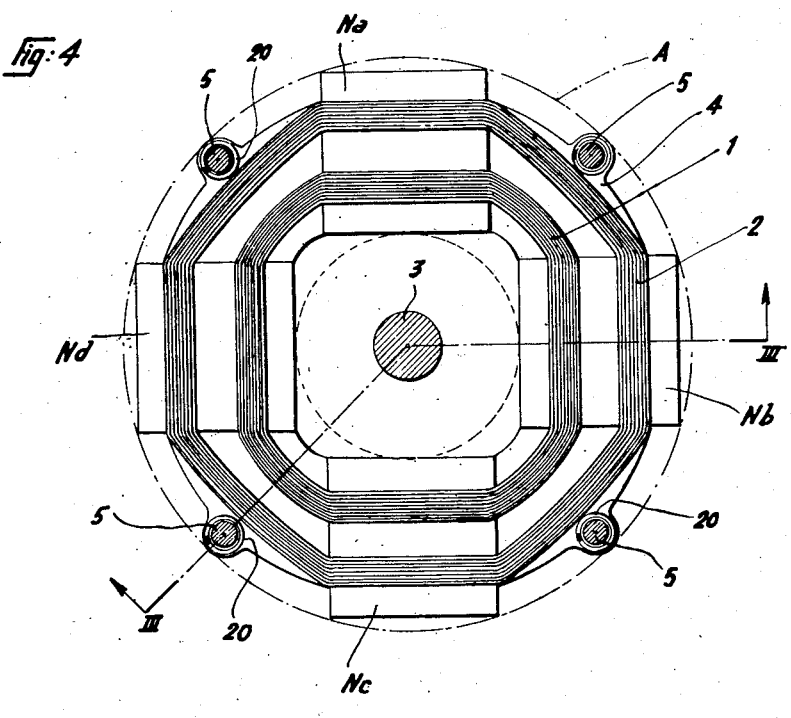

2,796,561

ELECTRO-MAGNETS FOR ALTERNATING CURRENTS, ESPECIALLY APPLICABLE TO ELECTRO-MAGNETIC COUPLING DEVICES SUCH AS BRAKES, CLUTCHES, ETC.

Jacques Rigoulot, Beaucourt, France, assignor to Etablissements Japy Freres (Société Anonyme), Paris, France, a French company Application April 5, 1954, Serial No. 421,112

Claims priority, application France April 14, 1953

4 Claims. (Cl. 317—188)

It is known that electro-magnets supplied with single-phase alternating current have a tendency to vibrate by reason of the periodic reduction to zero of the magnetic field induced by the current. This disadvantage is generally remedied by the use of short-circuited rings arranged on one of the poles of the electro-magnet; this arrangement however, considerably reduces the power of attraction of the electro-magnet.

Improved results are obtained by the use of polyphase currents which make it possible to obtain, by means of cores having a number of limbs each excited by one phase of the current a constant force of attraction, which means that these electro-magnets are at the same time silent and powerful. However, this arrangement leads to the use of a considerable number of coils, in particular for the purposes of electro-magnetic couplings. For example, the construction of a clutch or a brake having four pole-pieces and supplied with three-phase current, requires twelve identical coils, since each of the pole-pieces must comprise a core having three limbs each of which carries a winding supplied by one of the phases of the supply current.

With a view to simplifying the electrical assembly of electro-magnetic couplings, it is an advantage to utilise the same current for these couplings as that used to supply the remainder of the installation, which is alternating current.

The object of the present invention is to provide a powerful and silent electro-magnet which is supplied with alternating current and which enables, in particular, the construction of electro-magnetic couplings to be considerably simplified.

The electro-magnet in accordance with the invention comprises a core having three parallel limbs co-operating with a moving member of magnetic material, this being adapted simultaneously to close the partial magnetic circuits formed by the said limbs, one of the exterior limbs of the said core being enclosed by a first coil, the central limb and the first mentioned limb being simultaneously enclosed by a second coil having the same direction of winding as the first coil and having the same number of turns, these two coils being supplied by voltages which are phase-displaced by 60° with respect to each other.

It will be shown later in this description that this arrangement makes it possible to obtain in the three limbs three-phase magnetic fluxes, that is to say fluxes displaced in phase by $$\frac{2\pi}{3}$$

In consequence, an electro-magnet of this kind behaves as if the three limbs of its core were individually enclosed by three identical windings, each of which is traversed by one phase of a three-phase current supply. In other words, there is obtained an electro-magnet which does not vibrate and the power of attraction of which is high.

The invention has particular advantages in the case of electro-magnetic couplings comprising a number of pole pieces regularly spaced around a circumference. In this case, each of the pole-pieces is constituted by a core having three limbs arranged in the same radial plane and a first coil is adapted to enclose all the limbs which are arranged near the centre of the circumference, whilst a second coil, passing into the space comprised between the second and the third limb, counting from the centre towards the circumference, of each core, and thus simultaneously encloses the first and the second limbs of each of the said cores.

By this means, whatever the number of pole-pieces used may be, two coils are sufficient for the excitation of the whole of the pole-pieces. Referring back to the example previously given, the number of coils is reduced from twelve to two.

In addition, while the individual coils previously used must be wound with fine wire, so that they are fragile and also give rise to considerable difficulties in winding and mounting in position, the two coils which are used in accordance with the invention, may be wound with wire of larger cross-section, and are easier to wind and place in position. The economy ultimately obtained is thus considerable.

The use of three-phase current enables the supply of the two coils to be very readily obtained by means of two potentials phase-displaced by 60° with respect to each other. In practice, it is sufficient to connect one of the extremities of the two coils to one of the phases and the two other extremities to the two other phases. However, in the case of other alternating current systems, well-known connection expedients always make it possible to obtain two potentials phase-displaced in this way.

The description which follows below with respect to the attached drawings (which are given by way of example only and not in any sense by way of limitation) will make it quite clear how the invention may be carried into effect, the special features which are brought out, either from the drawings or from the text, being understood to form a part of the said invention.

Fig. 1 is a diagrammatic representation of an electro-magnet in accordance with the invention.

Fig. 2 is a vector diagram of the alternating potentials which are set-up in the system of connections shown in Fig. 1.

Fig. 3 shows, by way of example of an electro-magnetic coupling, an axial cross-section of a brake for an electric motor. This figure corresponds to the section-line III—III of Fig. 4.

Fig. 4 is a cross-section of this same brake following the line IV—IV of Fig. 3.

The electro-magnet shown in Fig. 1 comprises a core N having three limbs $B_1$, $B_2$, $B_3$ which are equal and parallel, and the magnetic circuit of which is adapted to be closed by an armature A arranged perpendicularly to the limbs and movable in the direction of the latter. This electro-magnet is excited by the winding 1 which surrounds the limb $B_1$ and by the winding 2 which simultaneously surrounds the limbs $B_1$ and $B_2$. These windings comprise an equal number of turns; for the sake of clearness, a single turn of each winding only has been shown.

Two potentials phase-displaced by 60° are applied to these windings. To this end, as has been shown in Fig. 1 the two corresponding ends of the turns 1 and 2, are connected to one of the terminals ($u_3$) of a three-phase network, and the two other ends of these turns are respectively connected to the terminals $u_1$ and $u_2$ of this same network. Thus, as is shown in the vector diagram of the potentials in Fig. 2, wherein $U_1$, $U_2$, $U_3$ represent, as usual, the alternating potentials applied to the terminals $u_1$, $u_2$, $u_3$ with respect to zero, the turn 1 is supplied by the potential $U_1-U_3=V_1$ and the turn 2 by the potential $U_2-U_3=V_2$ which are displaced in phase by 60°. The potentials $V_1$ and $V_2$ may also be obtained from alternating supply voltages of any other kind, either by static dephasing arrangements comprising judiciously dimensioned inductances or condensers, or by means or electrodynamic arrangements.

The turns 1 and 2 induce variable magnetic fluxes $\varphi_1$, $\varphi_2$, $\varphi_3$, in the limbs of the core N. If it is supposed that the core N is sufficiently permeable for the flux losses in the air-gap to be negligible, and if there is chosen a positive direction of these fluxes in the limbs $B_1$, $B_2$, $B_3$, for example towards the extremities of these latter, we have:

$$\varphi_1+\varphi_2+\varphi_3=0 \qquad (1)$$

By making the potentials equal to the variation of flux which they induce, there is obtained for the turn 1:

$$V_1=-\frac{d\varphi_1}{dt}$$

and for the turn 2:

$$V_2=-\frac{d}{dt}(\varphi_1+\varphi_2)$$

which gives:

$$-\frac{d\varphi_1}{dt}=V_1$$

$$-\frac{d\varphi_2}{dt}=V_2-V_1$$

and, substituting these values in the differentiated Equation 1:

$$-\frac{d\varphi_3}{dt}=-V_2$$

The diagram of Fig. 2 shows immediately that the three vector potentials $V_1$, $V_2-V_1$ and $-V_2$ form a three-phase system; this is also true in the case of the fluxes and the induction. In other words, the electro-magnet with three limbs shown in Fig. 1 behaves as if an independent winding were arranged around each of its limbs, these windings being supplied by the three phases of a three-phase current supply. However, the advantages of the arrangement in accordance with the invention are immediately apparent.

The electro-magnet only has two coils instead of three.

Between two limbs of the core, only one single thickness of coil passes, and this enables, on the one hand, the limbs to be placed closer together, thereby reducing the size and therefore the reluctance of the magnetic-circuit, on the other hand, to facilitate the insulation between the coils since the latter may be arranged in such a way as to have no point of contact (this is clearly not the case in the known constructions of three-phase electro-magnets, in which two thicknesses of coils must be placed in the same space between the limbs of the core).

The invention is of still greater advantage when the electro-magnetic device, for example a coupling, must consist of more than one electro-magnet, in which case the whole assembly of these electro-magnets can be excited by the same pair of coils 1 and 2 owing to the fact that one of these two coils wholly surrounds the other.

Thus, in the example of construction shown in Figs. 3 and 4, four three-pole cores $N_a$, $N_b$, $N_c$, $N_d$ are regularly spaced around a rotatable shaft 3 which is, in this case, the shaft of an electric motor. The four cores are carried by a flat ring 4 which is stationary. This ring is, in fact, mounted at the extremity of four rods 5 which are supported on the frame 6 of the stator of the machine which is provided with bearings such as 7, which carry the shaft 3. The moving armature A is a ring of ferromagnetic material having drilled holes to permit the free passage of the rods 5; the armature A is fixed to a second flat ring 9 through which the rods 5 also pass; the flat rings 10 and 11 are mounted in a similar manner on these same rods.

Between the flat rings 9 and 10 on the one hand, and between 10 and 11 on the other hand, are respectively mounted the discs 12 and 13 which are provided with friction linings 14 facing the flat faces of the rings 9, 10 and 11. These discs are fixedly mounted for rotation with the shaft 3; to this end, this shaft carries a keyed sleeve formed in two parts 15a and 15b which are locked in position by the nut 16. Pins 17 mounted parallel to the axis of the shaft 3, are supported at their extremities in the flanges of the sleeve. The discs 12 and 13 are arranged slidably on these pins which pass through the discs in the vicinity of their central bore. Springs 18 located on the pins between the discs tend to maintain the latter at a certain distance from each other.

In the same way, the springs 19 which are threaded over the rods 5 between the flat plates 9, 10 and 11, tend to space apart these plates from each other. Powerful springs 20 arranged on the rod 5 between the fixed ring 4 and the first moving ring 9 which carries the armature A, tend on the other hand to apply the discs against the flat plates.

This arrangement operates in the following manner:

When the coils 1 and 2 are not under voltage, the springs 20 force the discs and the flat rings against each other and the motor shaft is thus prevented from rotating. As soon as the current is switched on to the motor and to the coils 1 and 2, the armature A is attracted, the springs 20 are compressed and the springs 18 and 19 thus expand and separate the discs from the rings, thereby enabling the motor to rotate freely. Conversely, as soon as the current supply is cut-off, the motor is again braked.

For obvious reasons of safety, the motor is only freed when it is supplied with current whilst, on the contrary, it is prevented from rotating in the absence of current supply.

In order to control the air-gap between the armature A and the cores so as to prevent their adhesion due to remanent magnetism, adjustable abutment members 21 are provided to limit the travel of the armature A in the direction of the said cores.

In the case of the braking device which has just been described, the coils 1 and 2 are fixed and they may be connected to the supply network by fixed connections.

In the case of an electro-magnetic clutch, the conception of which may be exactly the same, but in which the ring 4 and the rods 5 would be free to rotate, the supply of current to the coils 1 and 2 may be provided by means of three slip-rings and three brushes.

A similar arrangement may be used in the construction of a chuck intended to hold in position work-pieces to be machined, by magnetic attraction.

In all cases, there may be any number of cores whatever (odd or even) and they will all be excited by means of two coils only.

It will be clear that modifications may be made to the forms of embodiment which have just been described, in particular by the substitution of equivalent technical means without thereby departing from the spirit or from the scope of the present invention.

What I claim is:

1. An alternating current electromagnet arrangement comprising at least a magnetic core having three parallel limbs of the same length and substantially equal cross-section; a movable magnetic armature adapted for co-operation with the ends of said limbs, a first exciting coil having a number of turns and surrounding one of said limbs, a second exciting coil simultaneously surrounding both the said limb and a second limb of said core, having substantially the same number of turns as said first coil and being, when seen from the same ends of the limbs, wound in the same direction as said first coil, electric means for supplying said first coil with alternating current and further electric means for supplying said second coil with alternating current of the same value and period as the first one but displaced in phase by about 60° with respect of said first current.

2. An alternating current electromagnet arrangement comprising at least a magnetic core having three parallel limbs of the same length and substantially equal cross-section, a movable magnetic armature adapted for cooperation with the ends of said limbs, a first exciting coil having a number of turns and surrounding one of said limbs, a second exciting coil simultaneously surrounding both the said limb and a second limb of said core, having substantially the same number of turns as said first coil and being, when seen from the same ends of the limbs, wound in the same direction as said first coil, a three phase alternating current source having three terminals, connecting means between two of the corresponding ends of said two coils and one of said terminals, and further connecting means between each of the other ends of said coils and each of the other terminals.

3. An electromagnetic circular coupling arrangement and particularly an electromagnetic circular brake comprising a plurality of radially arranged magnetic cores, each comprising three axially directed limbs having the same length and substantially equal cross-sections, said limbs being spaced apart of the center of said coupling by equally stepped distances, an axially movable magnetic armature cooperating with the ends of said limbs, a first exciting coil substantially concentric with said coupling, having a number of turns and surrounding the inner limbs of said cores by passing between each of said inner limbs and the median limbs thereof, a second exciting coil substantially concentric with said coupling having substantially the same number of turns as said first coil and surrounding the median limbs of said cores by passing between each of said median limbs and the outer limb thereof, said second coil being, when seen from the same side of the coupling, wound in the same direction as said first coil, electrical means for supplying said first coil with alternating current and further electrical means for supplying said second coil with alternating current of the same value and period as the first one, but displaced in phase by about 60° with respect of said first current.

4. An electromagnetic circular coupling according to claim 3 wherein the electrical means for supplying alternating currents to the coils comprise a three conductors circuit supplied by three phase currents and further comprising connecting means between one of these conductors and two corresponding ends of the two coils and further connecting means between each of the other conductors and each of the other ends of said coils.

References Cited in the file of this patent

UNITED STATES PATENTS

| | | |
|---|---|---|
| 688,670 | McGeorge | Dec. 10, 1901 |
| 2,434,034 | Chapman | Jan. 6, 1948 |
| 2,543,830 | Burris et al. | Mar. 6, 1951 |

FOREIGN PATENTS

| | | |
|---|---|---|
| 7,490 | Great Britain | May 3, 1906 |
| 5,154 | Great Britain | Aug. 30, 1906 |
| 15,009 | Great Britain | June 29, 1907 |
| 440,883 | Great Britain | Jan. 6, 1936 |